Sept. 19, 1944. B. M. HYMAN 2,358,513
TRACTOR-MOUNTED IMPLEMENT
Filed May 10, 1941 4 Sheets-Sheet 1

Inventor:
Benjamin M. Hyman.
By Paul O. Pippel
atty.

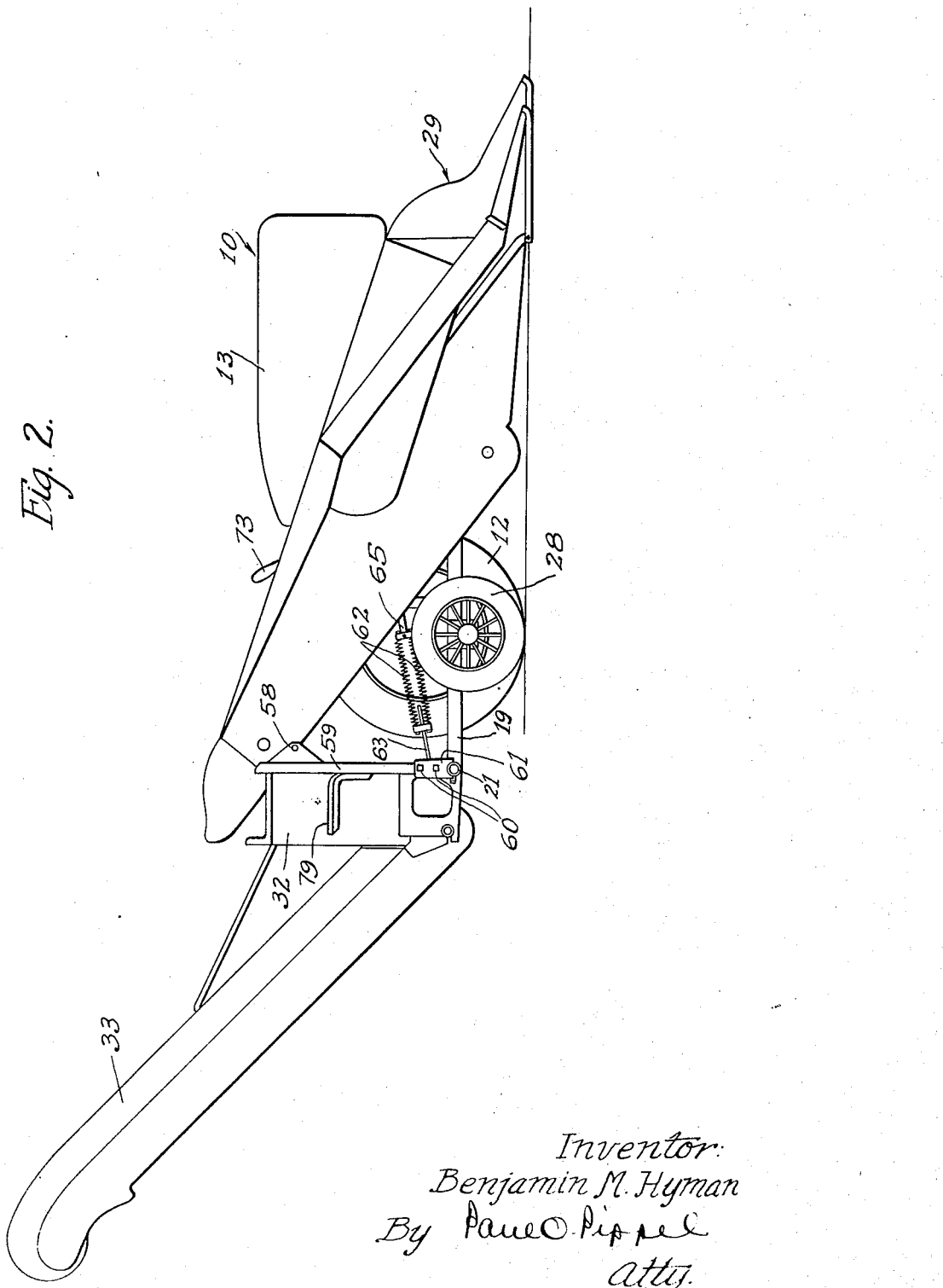

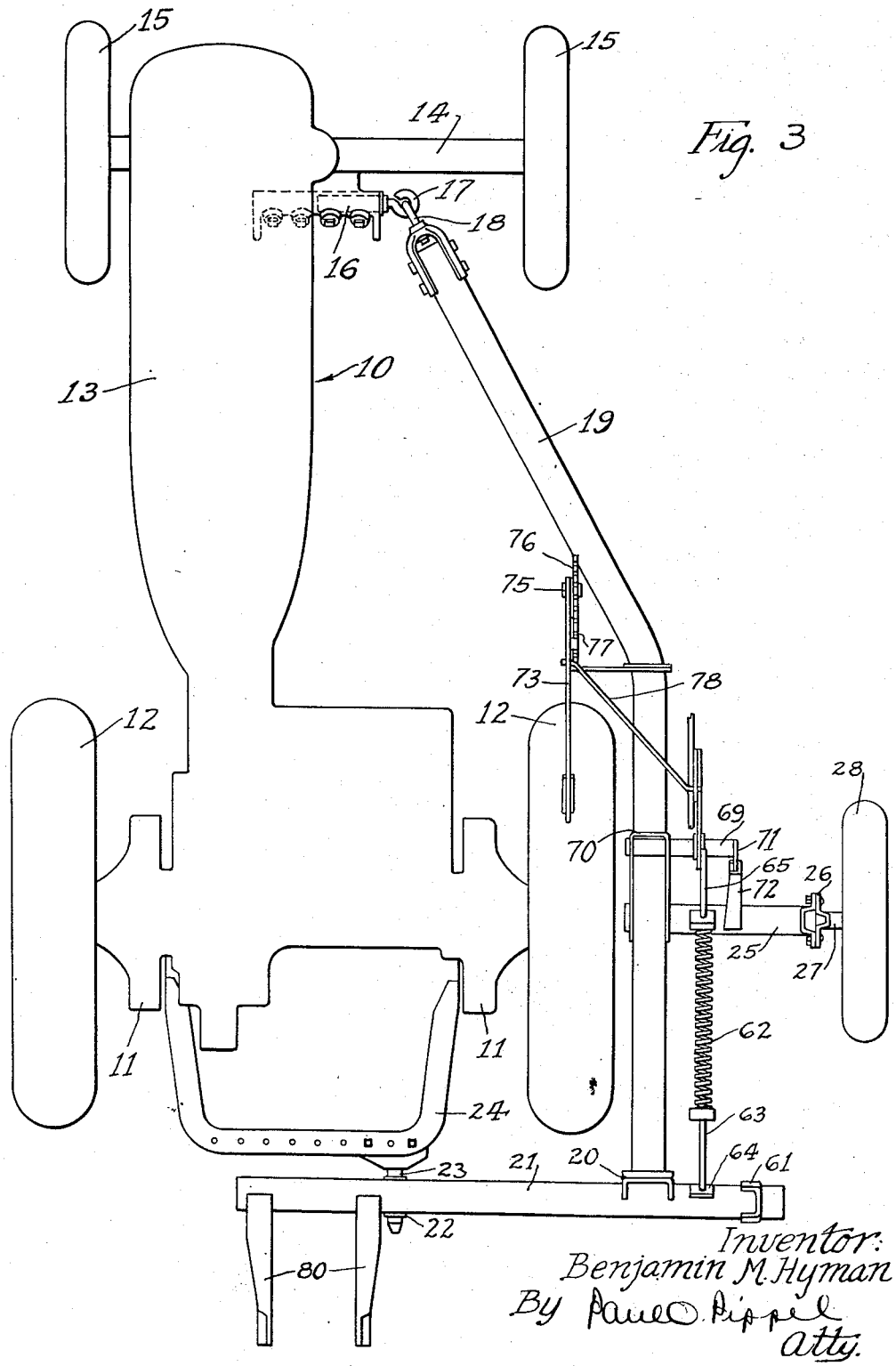

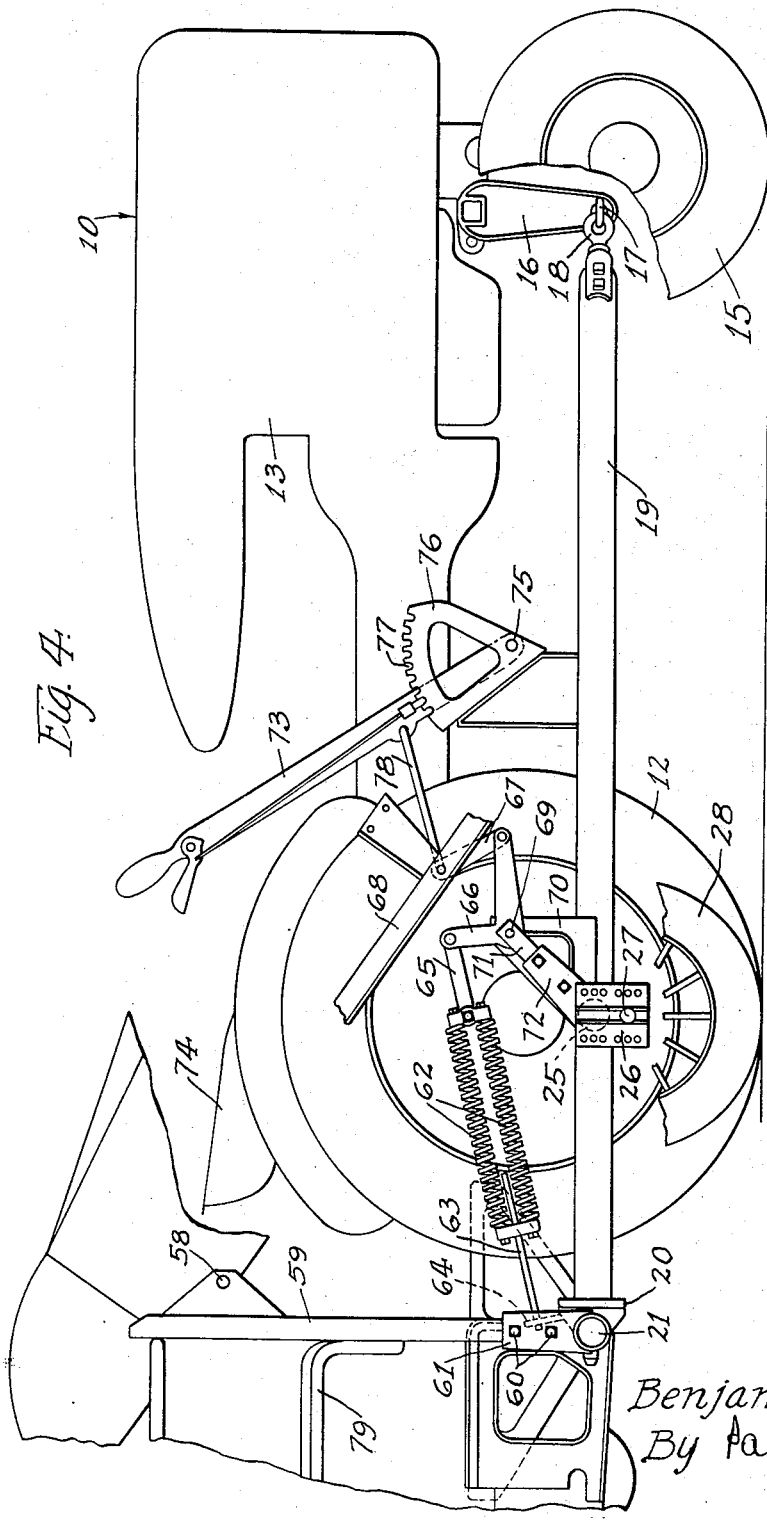

Patented Sept. 19, 1944

2,358,513

UNITED STATES PATENT OFFICE 2,358,513

TRACTOR-MOUNTED IMPLEMENT

Benjamin M. Hyman, Moline, Ill., assignor to International Harvester Company, a corporation of New Jersey Application May 10, 1941, Serial No. 392,924

12 Claims. (Cl. 56—18)

This invention relates to a tractor-mounted implement. More specifically, it relates to a harvester supported on a frame connected at the side of a tractor.

The present practice, as far as mounting of harvesters positioned at the side of a tractor is concerned, is to mount the harvesters on the tractor so that they are entirely supported thereby. If the harvester is of considerable size or of great weight, the mounting is necessarily complicated. The present application has to do with the supporting of a harvester, or other implement, at the side of a tractor by means of a frame which is supported both by the tractor itself and by a special supporting wheel. In the present application, the implement frame pivots about a longitudinal axis on the tractor and adjustment of the implement about a transverse axis is effected through relative movement between the implement and the implement frame and not between the implement frame and the tractor.

An object of the present invention is to provide an improved tractor-mounted implement.

A further object is the provision of an implement frame for connecting an implement to a tractor.

A further object is to provide an improved mode of attaching an implement frame to a tractor.

Still another object is the provision of a mode of supporting in part on a tractor a wheel-supported implement frame by connection with the tractor.

According to the present invention, an implement frame is connected alongside a tractor so as to have pivotal movement with respect to the tractor about a longitudinal axis and to be supported in part thereby and also by a special supporting wheel. The implement mounted on the frame is a corn picker, or other harvester, and is adjusted with respect to the tractor by movement with respect to the frame.

In the drawings:

Figure 2 is a side view of the parts shown in Figure 1;

Figure 3 is a plan view showing the tractor and the implement frame; and

Figure 4 is a side view showing the tractor, the implement frame, and a portion of the corn picker mounted on the frame.

Figure 1:
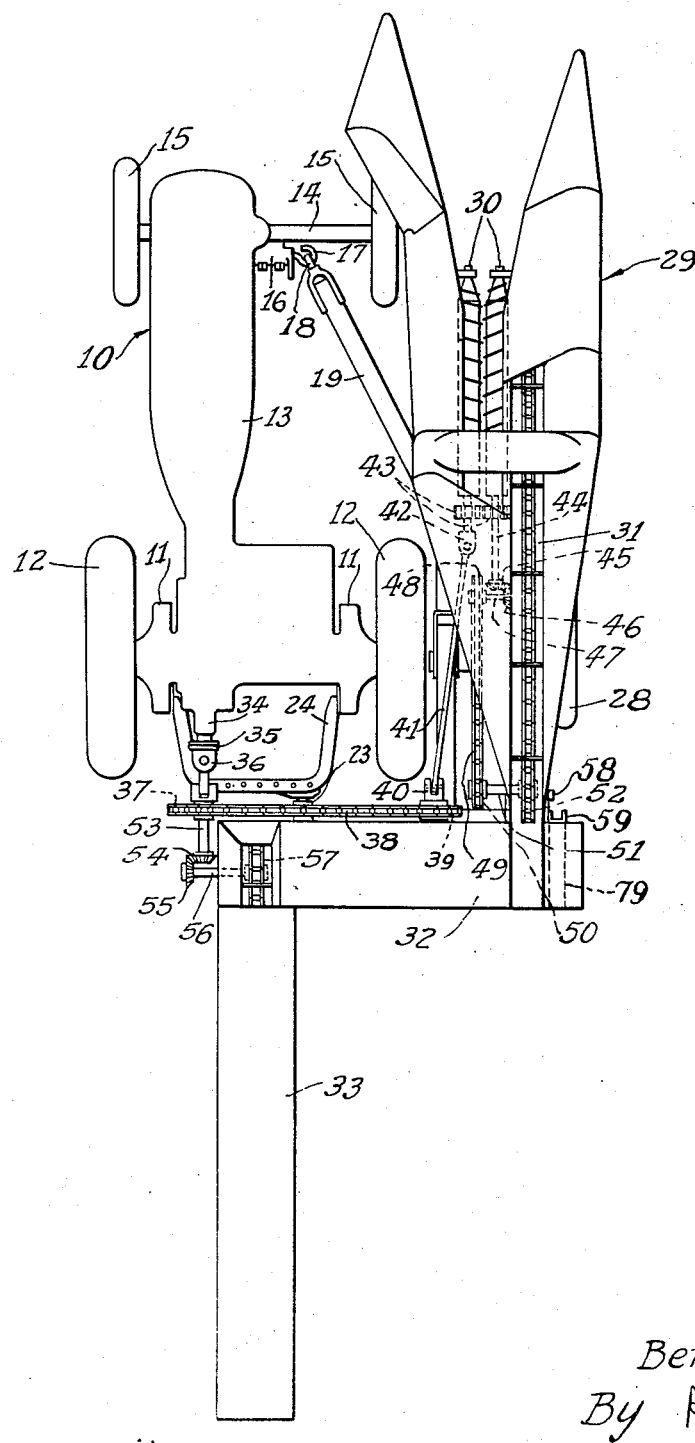
Figure 1 is a plan view showing a tractor and a corn picker connected to the tractor by a supporting frame in accordance with the present invention.

The reference character 10 denotes a tractor having a rear axle 11, rear wheels 12, a body 13 offset to one side of a longitudinal center line midway between the wheels 12, a front axle 14, and front wheels 15. A bracket structure 16 is secured to the front axle 14 and carries an eye member 17. The eye member 17 is connected with an eye member 18 secured to the front end of a longitudinally extending frame member 19. The rear end of the frame member 19 is secured by means 20 to a transverse frame member 21. The frame member 21 has secured thereto a sleeve 22 rotatively mounted on a bearing member 23 secured to a U-shaped draw-bar 24 secured to the rear axle 11. The sleeve 22 and bearing 23 form a pivot which is alined longitudinally of the tractor with the connection of the eye members 17 and 18, so that the frame members 19 and 21 pivot about an axis extending longitudinally of the tractor. This axis is positioned to the side of the longitudinal center line of the tractor opposite that to which the tractor body 13 is positioned, so that the part of the weight imposed by the frame members 19 and 21 upon the tractor acts on a line offset from the longitudinal center line and, consequently, tends to balance the weight of the offset body 13.

A short frame member 25 is secured to the frame member 19 and extends outwardly therefrom. A depending structure 26 is connected with the outer end of the frame member 25 and connects it with a stub axle 27, which is positioned therebelow and carries a supporting wheel 28.

As seen in Figure 1, the frame members carry a corn snapper 29 comprising a pair of snapping rolls 30, an elevator 31 extending rearwardly from a point alongside the snapping rolls, a chute 32 positioned under the rear end of the elevator 31, and a wagon elevator 33 extending upwardly and rearwardly from one end of the chute 32. Drive of the corn snapper is effected through the power take-off 34 of the tractor from which drive is transmitted through a slip clutch 35, universal connection 36, a sprocket 37, a chain 38, sprocket 39 mounted upon the chute 32, universal joint 40, shaft 41, and universal joint 42 to the end of one snapping roll. Gear sections 43 transmit drive from one roll to the other end and the other snapping roll has a shaft extension 44 to the rear end of which is secured a bevel gear 45. This bevel gear meshes with a second bevel gear 46 secured to a shaft 47, to which is also secured a sprocket 48. The sprocket 48 meshes with a chain 49, which meshes with a sprocket 50 secured to a shaft 51, to which is also secured a sprocket 52 driving the elevator 31. The sprocket 37 is secured to a shaft 53, to which is secured a bevel gear 54 meshing with another bevel gear 55 secured upon a shaft 56. A sprocket 57, secured to the shaft 56, drives a wagon elevator 33.

Pivoting movement of the corn snapper 29 and its supporting frame members about a longitudinal axis with respect to the tractor 10 takes place by virtue of the connection between the eye members 17 and 18 and the sleeve 22 and the bearing 23. The part of the corn snapper comprising the rolls 30 and the elevator 31 is pivotally secured at 58 to a vertical member 59 bolted, as at 60, to a bracket 61 secured to the transverse frame member 21. The snapping rolls and elevator may pivot with respect to the supporting frame and the tractor about a transverse axis formed by the pivot 58.

The weight of the snapping rolls and elevator is counterbalanced by springs 62, which are connected at one end to the transverse frame member 21 by a rod 63 and a plate member 64, and are connected at the other end with the snapper by a part 65 secured to the said other end of the springs, a bell-crank 66, and a link 67 connecting the bell-crank and an angle member 68 forming part of the snapper unit. The bell-crank 66 is pivoted on a transverse pin 69 supported at one end by a bracket 70 secured to the longitudinal frame member 19 and at the other end by a member 71, secured to a channel member 72 secured in turn to the short frame member 25. Adjustment of the movable portion of the snapper unit and holding thereof in any adjusted position is effected by a detent lever 73, which is within easy reach of an operator's station 74 on the tractor 10. The detent lever 73 is pivotally connected at 75 to an arcuate sector 76 and is engageable with teeth 77 thereon. A link 78 connects the lever 73 and the angle member 68 of the snapper unit.

The chute 32 is supported at one end on the vertical member 59 through the angle member 79 secured to the chute and to the vertical member. The other end of the chute 32 is connected with the wagon elevator 33, which is secured to the transverse frame member 21 by bracket members 80.

It will be apparent from the foregoing description that a new and novel arrangement has been provided for supporting an implement alongside a tractor. The implement is adjustably mounted on a frame which is supported on a special supporting wheel and on connections with the tractor, which are in longitudinal alinement with one another and form a longitudinal pivot axis for the implement and the frame with respect to the tractor. The rear point of connection of the frame with the tractor is at the tractor draw-bar. The front point of connection is adjacent the front axle.

The intention is to limit the invention only within the scope of the appended claims.

What is claimed is:

1. In combination, a tractor having a rear axle and wheels at the ends thereof, a frame connected to the tractor at two points spaced lengthwise of the tractor for pivoting about an axis extending lengthwise of the tractor and extending outwardly beyond one wheel, a supporting wheel for the frame positioned outwardly of the said one wheel, a crop-gathering device, means mounting the crop-gathering device on the frame for adjustment with respect to the frame, crop-advancing means positioned to receive crops from the crop-gathering device, and means mounting the crop-advancing means on the frame against movement with respect thereto.

2. In combination, a tractor having a rear axle and wheels at the ends thereof, a frame connected to the tractor at two points spaced lengthwise of the tractor for pivoting about an axis extending lengthwise of the tractor and extending outwardly beyond one wheel, a supporting wheel for the frame positioned outward of the said one wheel, a corn-picking device extending alongside the tractor, means mounting the corn-picking device on the frame for pivoting with respect to the frame, crop-advancing means positioned to receive corn from the corn-picking device and to advance the corn transversely of the tractor, and means mounting the crop-advancing means on the frame against movement with respect thereto.

3. In combination, a tractor having a draw-bar at the rear thereof, a rear axle, and wheels at the ends thereof, a frame extending outwardly around one wheel and connected at one end to the tractor draw-bar and at the other end to the tractor adjacent the front thereof for pivotal movement with respect to the tractor about an axis extending lengthwise thereof, a supporting wheel for the frame positioned outside the said one wheel, a crop-gathering device positioned alongside the tractor, means mounting the crop-gathering device on the frame for pivotal movement with respect thereto, crop-advancing means arranged to receive crops from the crop-gathering device and to advance them transversely of the tractor, and means mounting the crop-advancing means on the frame against movement with respect thereto.

4. In combination, a tractor having a draw-bar at the rear thereof, a rear axle, and wheels at the ends thereof, a frame extending outwardly around one wheel and connected at one end to the tractor draw-bar and at the other end to the tractor adjacent the front thereof for pivotal movement with respect to the tractor about an axis extending lengthwise thereof, a supporting wheel for the frame positioned outside the said one wheel, a corn-picking device positioned alongside the tractor, means mounting the corn-picking device on the frame for pivotal movement with respect thereto, corn-advancing means arranged to receive corn from the corn-picking device and to advance it transversely of the tractor, and means mounting the corn-advancing means on the frame against movement with respect thereto.

5. In combination, a tractor having a draw-bar at the rear thereof, a rear axle, and wheels at the ends thereof, a frame extending outwardly around one wheel and connected at one end to the tractor draw-bar and at the other end to the tractor adjacent the front thereof for pivotal movement with respect to the tractor about an axis extending lengthwise thereof, a supporting wheel for the frame positioned outside the said one wheel, a device positioned alongside the tractor for gathering crops adjacent the front of the tractor and conveying them rearwardly at least as far as the said one tractor wheel, means mounting the device on the frame for pivotal movement with respect thereto, means arranged to receive crops from the device and to advance them transversely of the tractor toward the longitudinal center line thereof, and means mounting the last mentioned means on the frame against movement with respect thereto.

6. In combination, a tractor having a rear axle and wheels at the end thereof, a frame extending outwardly beyond one wheel, means pivotally connecting the frame for pivotal movement with respect to the tractor about an axis extending lengthwise thereof, a supporting wheel for the frame positioned outward of the said one wheel, a device positioned alongside the tractor for gathering crops adjacent the front of the tractor and conveying them rearwardly at least as far as the said one tractor wheel, means mounting the device on the frame for pivotal movement with respect thereto, means arranged to receive crops from the device and to advance them transversely of the tractor toward the longitudinal center line thereof, and means mounting the last mentioned means on the frame against movement with respect thereto.

7. In combination, a tractor having a draw-bar at the rear thereof, a rear axle, and wheels at the ends thereof, a frame extending outwardly around one wheel and connected at one end to the tractor draw-bar and at the other end to the tractor adjacent the front thereof for pivotal movement with respect to the tractor about an axis extending lengthwise thereof, a supporting wheel for the frame positioned outside the said one wheel, a unit positioned alongside the tractor and comprising snapping rolls extending alongside the tractor to a point adjacent the front thereof, and a conveyor extending rearwardly from the rolls at least as far as the said one tractor wheel, means mounting the unit on the frame for pivotal movement with respect thereto in a vertical plane, means positioned at the rear of the tractor for transferring corn from the conveyor laterally toward the center line of the tractor, means rigidly mounting the corn-transferring means on the frame, a wagon elevator positioned at the rear of the tractor to receive corn from the corn-transferring means and to move it rearwardly therefrom, and means mounting the wagon elevator on the frame.

8. In combination, a tractor having a draw-bar at the rear thereof and rear traction wheels, a frame extending along the rear of the tractor outwardly beyond one wheel, a supporting wheel for the frame positioned outward beyond the said one wheel, means pivotally connecting the frame to the draw-bar for partial support of the frame thereon, means connecting another point of the frame with the tractor for causing the frame to pivot about the first point on an axis extending generally lengthwise of the tractor, means for picking corn ears at the side of the tractor, means mounting the picking means on the frame, means for adjusting the picking means with respect to the frame, a wagon elevator for corn ears extending longitudinally of the tractor from the rear thereof, means mounting the wagon elevator on the tractor, means for transferring corn ears from the picking means transversely of the tractor at the rear thereof to the wagon elevator, and means mounting the transferring means on the frame.

9. In combination, a tractor having a draw-bar at the rear thereof, and rear traction wheels, a frame extending along the rear of the tractor outwardly beyond one wheel, a supporting wheel for the frame outside the said one wheel, means pivotally connecting the frame to the tractor draw-bar for partial support of the frame thereon, means connecting another point of the frame with the tractor for providing the frame with a pivotal movement at its connection with the tractor draw-bar about an axis extending generally lengthwise of the tractor, means for picking corn at the side of the tractor, means mounting the picking means on the frame, means for adjusting the picking means with respect to the frame, means for transferring corn from the picking means transversely of the tractor at the rear thereof toward the longitudinal center line of the tractor, and means mounting the transferring means on the frame.

10. In combination, a tractor having a rear axle and wheels at the ends thereof, a frame extending outwardly around one wheel and pivotally connected to the tractor, a supporting wheel for the frame positioned outside the said one tractor wheel, a crop-gathering means extending along the same side of the tractor as the said one wheel, means mounting the crop-gathering means on a transverse pivot axis on the frame above and to the rear of the rear axle, means for transferring crops from the rear end of the crop-gathering device transversely of the tractor thereof to a point at the rear thereof, and means mounting the crop-transferring means on the frame against movement with respect thereto.

11. In combination, a tractor having a rear axle and wheels at the end thereof, a frame extending outwardly around one wheel, a supporting wheel for the frame positioned outside the said one tractor wheel, means pivotally connecting the frame to the tractor, a corn-snapping unit positioned at the same side of the tractor as the said one tractor wheel, means mounting the snapping unit on the framework for pivotal movement about a transverse axis above and to the rear of the rear axle, a wagon elevator extending rearwardly from the tractor, means mounting the wagon elevator on the tractor, means for transferring crops from the rear end of the snapping unit transversely of the tractor to the wagon elevator, and means mounting the crop-transferring means against movement with respect to the framework.

12. In combination, a tractor having a rear axle, a supplementary supporting wheel, a supporting frame connected with the tractor so as to be carried in part thereby and connected with the supplementary supporting wheel so as to be carried in part thereby, a crop-gathering device extending alongside the tractor, means mounting the crop-gathering device on the supporting frame for pivoting about a transverse axis above and to the rear of the rear axle, means for transferring crops from the rear end of the crop-gathering device transversely of the tractor to a point at the rear thereof, and means mounting the crop-transferring means on the frame against movement with respect thereto.

BENJAMIN M. HYMAN.